United States Patent
Lilburn et al.

(10) Patent No.: US 6,950,777 B1
(45) Date of Patent: Sep. 27, 2005

(54) METHOD AND SYSTEM FOR ASSESSING PULP AND PAPER MILL PERFORMANCE

(75) Inventors: David Andrew Lilburn, Pittsboro, NC (US); Christopher Lee Spence, Pinehurst, NC (US)

(73) Assignee: Voith Paper Inc., Appleton, WI (US)

( * ) Notice: Subject to any disclaimer, the term of this patent is extended or adjusted under 35 U.S.C. 154(b) by 76 days.

(21) Appl. No.: 10/629,332

(22) Filed: Jul. 29, 2003

(51) Int. Cl.[7] .............................................. G06F 15/00
(52) U.S. Cl. ..................... 702/179; 702/66; 702/75; 702/81; 702/179; 700/129; 700/122; 250/559.01; 162/380; 162/252
(58) Field of Search ............................. 702/66, 75–77, 702/81–84, 179, 189; 700/129, 122; 250/559.01; 162/380, 252

(56) References Cited

U.S. PATENT DOCUMENTS

| | | | | |
|---|---|---|---|---|
| 3,992,100 | A | * | 11/1976 | Lodzinski et al. ............. 356/73 |
| 4,644,174 | A | * | 2/1987 | Ouellette et al. ...... 250/559.01 |
| 4,936,141 | A | * | 6/1990 | Anderson et al. ............. 73/159 |
| 5,745,365 | A | | 4/1998 | Parker |
| 5,771,174 | A | * | 6/1998 | Spinner et al. ............. 700/129 |
| 5,960,374 | A | | 9/1999 | Lausier |
| 5,974,160 | A | * | 10/1999 | Shiratori et al. ............. 382/112 |
| 6,174,413 | B1 | | 1/2001 | Ruf et al. |
| 6,254,726 | B1 | | 7/2001 | Steiner et al. |
| 6,263,291 | B1 | * | 7/2001 | Shakespeare et al. ......... 702/85 |
| 6,299,730 | B1 | | 10/2001 | Broek et al. |
| 6,334,930 | B1 | | 1/2002 | Griech et al. |
| 6,368,461 | B1 | | 4/2002 | Ruf et al. |
| 6,452,679 | B1 | | 9/2002 | Workman, Jr. |
| 6,498,646 | B1 | | 12/2002 | Typpo et al. |
| 6,521,089 | B1 | | 2/2003 | Griech et al. |
| 6,524,441 | B2 | | 2/2003 | Ruf et al. |
| 6,526,369 | B1 | | 2/2003 | Meinecke et al. |
| 6,567,720 | B1 | | 5/2003 | Figiel |
| 6,585,860 | B2 | | 7/2003 | Ruf et al. |

FOREIGN PATENT DOCUMENTS

EP          1188860 A2    3/2002

OTHER PUBLICATIONS

Champagne et al., 'Multigrade Modeling-Paperboard Quality Modeling', May 8-10, 2002, AACC, pp. 602-603.*

* cited by examiner

Primary Examiner—Patrick Assouad
Assistant Examiner—Elias Desta
(74) Attorney, Agent, or Firm—Foley & Lardner LLP

(57) ABSTRACT

A system and method is provided for analyzing data obtained during manufacture of a web of paper or paperboard on a machine. The system comprises a computer including a database module, a statistical analysis module, and a processor for executing the modules. The database module contains measurements of quality parameters obtained from the web during manufacture. The statistical analysis module is executed by the processor to analyze the measurement data and estimate a target shift in at least one quality parameter that could be made if the controllable variations were removed. The target shift can be transformed into an economic amount (i.e., dollar value) by the statistical analysis module to assist the mill operator with making well informed, economic based decisions. The system further includes a diagnostic module capable of automatically identifying machine parameters that correlate to quality parameters that caused the web to fall outside the desired quality specifications.

43 Claims, 9 Drawing Sheets

METHOD AND SYSTEM FOR ASSESSING PULP AND PAPER MILL PERFORMANCE

FIELD OF THE INVENTION

The present invention relates to systems and methods for analyzing performance of paper machines, and more particularly to an automated process and apparatus for establishing baselines for paper machines and for forecasting and verifying benefits of process improvements.

BACKGROUND OF THE INVENTION

Modern pulp and paper mills invariably have computerized control systems for monitoring and controlling the manufacture of moving webs of products, such as webs of paper or paperboard. In addition to ensuring that the paper and/or cardboard machines perform as desired and produce product of the appropriate quality, the control systems operate the machines as efficiently as possible. In order to accomplish this, the controllers associated with each machine gather large volumes of data regarding performance of the machine and the quality of the paper product so that the data can be analyzed.

With the increasing cost of energy and materials needed to run the machines and produce the paper, mill owners are continuously looking for ways to manage and conserve both energy and materials. Paper that is produced outside of the quality specifications set by the customer typically results in excess consumption of energy or materials, or both. For example, portions of the product having basis weight and/or moisture that is out of specification must often be rejected. Although the rejected portions can be re-pulped and used in subsequent productions, the energy used to produce the rejected portions cannot be recaptured. Even if no portions of the product are rejected, portions having higher basis weight than specified represent increased manufacturing costs due to the extra fiber that is used. Similarly, portions of the product having increased moisture may force the moisture target for the entire reel to be lowered, which results in increased manufacturing costs due to the extra steam needed to dry the reel. Accordingly, manufacturing a reel outside the quality specifications invariably results in lost or missing profit opportunities.

Numerous methods are known in the prior art for regulating the quality parameters (e.g., basis weight and moisture) of a paper or paperboard web in an effort to produce product within the desired quality range. According to one known method, measurements of the quality parameters are obtained at the dry end of the machine and compared to predetermined target values to obtain variances or "error" values that are used to maintain the parameters within desired control bands. For example, the variances in basis weight can be used to vary the concentration of material suspension supplied to the headbox at the wet-end of the machine to regulate the basis weight of the web being produced. Similarly, the variances in moisture can be used to vary the speed of the web so that the amount of time the web remains in the dryer section is increased or decreased as needed to regulate the moisture of the web being produced. Alternatively, or in addition, the variances in moisture can be used to alter the amount of heat energy (e.g., steam or gas) supplied to the dryer section to increase or decrease the evaporation rate.

Due to the time lag between when the measurements of the quality parameters are taken and the corresponding adjustments in machine operation are made, periodic variations having relatively long wavelengths (in the machine direction) will invariably result. However, additional and significant periodic variations in the quality variables can also result in the machine as well as cross-directions due to other factors such as temperature variations, pressure variations, finishing tolerances, and errors in the operation or adjustment of the machine. As a result, paper mills often run their machines at higher weights and lower moistures than requested by the customer to ensure that the lower tail of sampling distribution is above the specification limit. As problems with machines develop over time, however, the targets are often shifted further even away from the customer's specifications to compensate for poor machine operation, often without the mill being aware how much this shifted operation is costing in terms of additional materials, energy and lost production.

In nearly all modern process control systems, the measurements of the web parameters (e.g., basis weight and moisture) are transmitted to a database server and stored in a database program (called a "data historian") for future use and analysis. In addition to basis weight and moisture content, the data historian may record other web quality parameters, such as caliper and opacity. In addition, the data historian may be used to record parameters associated with the operation of the machine such as bearing vibrations, steam and pump pressures, fan speeds, temperatures, and the like. As persons skilled in the art will appreciate, these machine parameters may be used to diagnose the condition of the machine when problems are suspected using techniques that are well known in the industry.

Although modern control systems are capable of monitoring and recording numerous parameters associated with quality of the web product and operation of the machine, this data is only as useful as the tools used for analyzing it. For example, it is known in the art to manually download data from the data historian into a spreadsheet and to hand calculate the histogram of the basis weight and moisture values. Based on the rule of thumb that 50% of the process variation can be removed by a good control system, it has been possible in the past to estimate the potential savings in fiber and energy by reducing the basis weight target and increasing the moisture target. However, this process is manually intensive and requires the services of a skilled technician to visually identify the variations that are potentially removable along with identifying the possible causes. As such, these calculations have heretofore been conducted only on an infrequent basis, such as when a machine is first commissioned or after a significant change has been made in machine operation.

In view of the foregoing, it would be beneficial to provide a fully automated system and method for estimating the economic cost of operating the machine to produce web product that is outside the quality specification called for by the customer. It would also be beneficial to provide a fully automated system and method for assessing this economic cost that is able to operate continuously and substantially in real time. In addition, it would be desirable to provide a system and method for verifying the economic benefits obtained after an improvement has been implemented in the process. Moreover, it would be beneficial to provide a system and method capable of automatically analyzing machine operation to identify potential improvements that could provide economic benefit.

SUMMARY OF THE INVENTION

The present invention relates to an automated process and apparatus for establishing baselines for paper machines and for forecasting and verifying benefits of process improvements.

According to a first aspect of an embodiment of the present invention, an automated system for analyzing data obtained during manufacture of a web of paper or paperboard on a machine includes a computer. The computer includes a database module, a statistical analysis module, and a processor for executing the modules. The database module contains measurements of quality parameters obtained from the web during manufacture. The statistical analysis module is executed by the processor to analyze the measurement data and estimate a target shift in at least one quality parameter that could be made if the controllable variations were removed.

According to a further aspect of an embodiment of the present invention, a method is provided for analyzing data obtained during manufacture of a web of paper or paperboard on a machine using an automated system. The system includes a computer including a database module, a statistical analysis module and a processor for executing the modules. The database module includes measurements of quality parameters obtained from the web during manufacture. The method comprises executing the statistical analysis module on the processor to perform a statistical analysis of the measurement data in the database module to estimate a target shift in at least one quality parameter that could be made if the controllable variations were removed.

These and other benefits and features of embodiments of the invention will be apparent upon consideration of the following detailed description of preferred embodiments thereof, presented in connection with the following drawings in which like reference numerals are used to identify like elements throughout.

Figure 1:
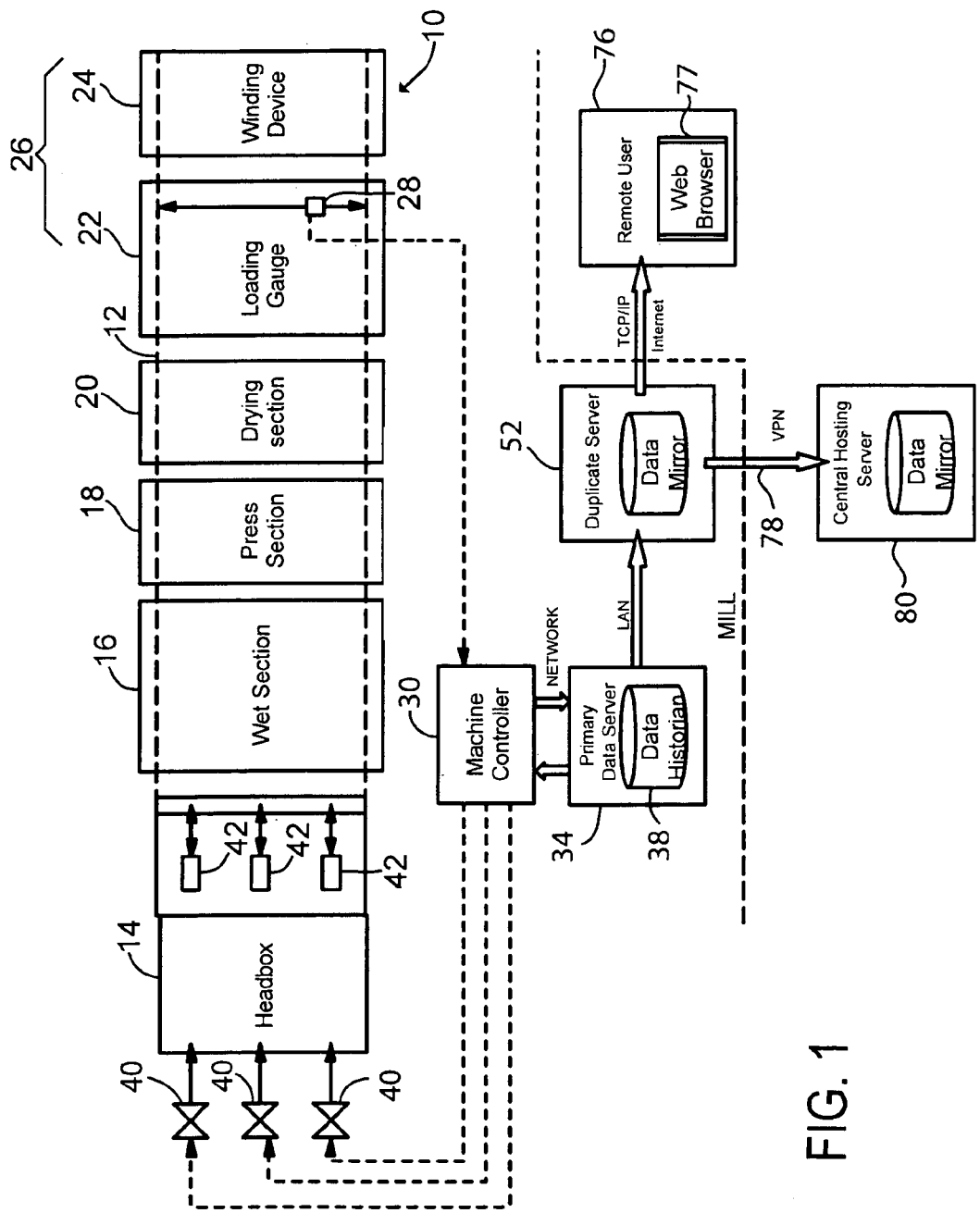
FIG. 1 is schematic representation of a paper machine and several data servers configured for practicing the present invention.
Figure 2A:
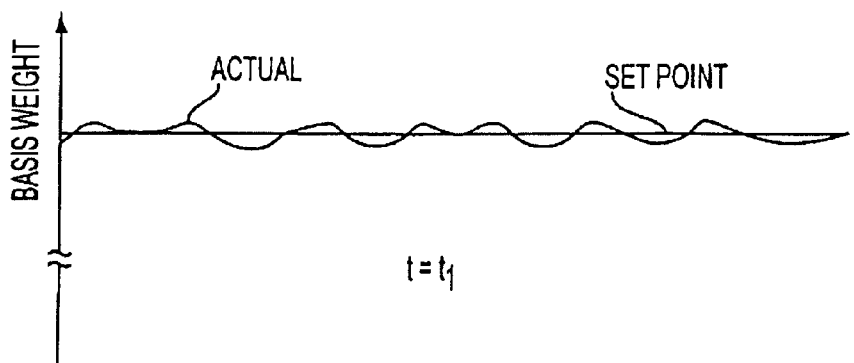
FIGS. 2A–2C are basis weight cross-direction profiles of a web in the paper machine of FIG. 1 at times $t_1$, $t_2$ and $t_3$, respectively.
Figure 2B:
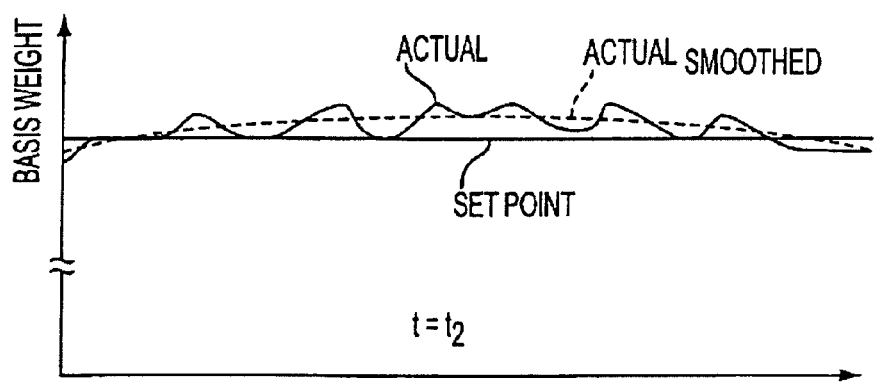
Figure 2C:
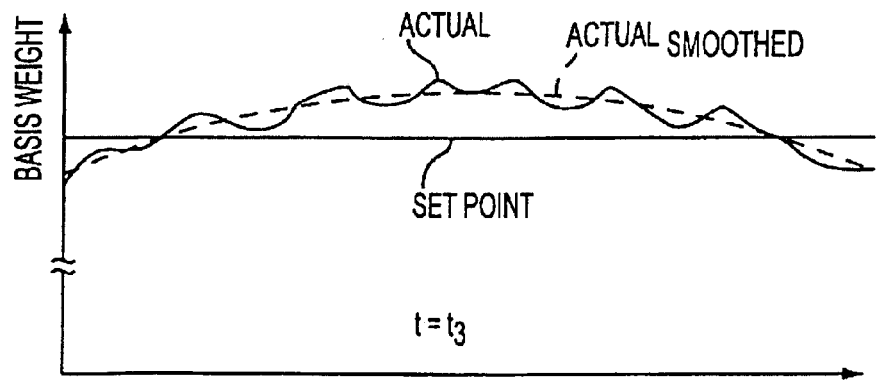

Before explaining several preferred embodiments of the present invention in detail it is noted that the invention is not limited to the details of construction or the arrangement of components set forth below or illustrated in the drawings. The invention is capable of other embodiments and being practiced or carried out in various ways. It is also noted that the phraseology and terminology employed herein is for purposes of description only and should not be regarded as limiting.

DETAILED DESCRIPTION OF THE PREFERRED EMBODIMENTS

The particulars shown herein are by way of example and for purposes of illustrative discussion of the embodiments of the present invention only and are presented in a manner that is believed to provide the most useful and readily understood description of the principles and concepts of the present invention. In this regard, no attempt is made to show structural details of the present invention in more detail than is necessary to provide a fundamental understanding of the present invention. The description of the invention taken with the drawings is believed sufficient to make it apparent to those skilled in the art how several forms of the present invention may be embodied in practice.

Turning now to the drawings and referring initially to FIG. 1, a machine 10 for manufacturing a web 12 of paper or paperboard is shown. In the illustrated embodiment, machine 10 includes a headbox 14 and a subsequent wet section or former 16. Headbox 14 is preferably sectioned over the machine width and the sections are individually regulated (e.g., by opening of the slice and/or by adding trim water). A press section 18 and a drying section 20 follow wet section 16. A loading gauge or measuring frame 22 and a winding device 24 for the finished web 12 are located at a dry end 26 of machine 10.

As persons skilled in the art will understand, machine 10 includes a separate control loop for regulating each quality control parameter of interest (e.g., basis weight and moisture). In the illustrated embodiment, each of the control loops utilizes measurements from a sensing device 28 located in loading gauge 22. In this regard, sensing device 28 is preferably capable of measuring each quality parameter of interest. Alternatively, a separate (i.e., dedicated) sensing device could be used for measuring each quality parameter of interest in loading gauge 22, or anywhere else in machine 10 that is known in the art (e.g., basis weight could be measured in the wet section). According to the illustrated embodiment, sensing device 28 includes a sensor that repeatedly traverses back and forth across the width of web 12 (e.g., a new scan is commenced every 20 or 30 seconds) so that measurements of each quality parameter of interest can be taken at a large number of data boxes (e.g., 256 or 512). The data boxes substantially span the entire width of web 12. One example of a suitable sensing device including both a stationary and a traversing sensor component is shown in commonly owned U.S. Pat. No. 6,174,413, the entire contents of which is hereby incorporated by reference herein. Alternatively, the sensing device may comprise a stationary cross-direction profile measurement device (e.g., an array of 256 stationary LEDs), such as shown in commonly owned U.S. Pat. No. 6,526,369, the entire contents of which is hereby incorporated by reference herein. As yet another alternative, the sensing device may comprise a digital camera that is used to derive the machine direction and cross-direction profiles of the quality control parameters of interest by using imaging operations in accordance with techniques that are well known in the art. An exemplary moisture sensing device (i.e., a dedicated sensor) is disclosed in commonly owned U.S. Pat. No. 6,254,726, the entire contents of which are hereby incorporated by reference herein.

Regardless of the particular number, types and locations of the sensing device(s) 28 being used, the measurements therefrom are provided to a machine controller 30. Controller 30 compares the measurements for each quality parameter of interest to a corresponding target value to obtain a variance. As persons skilled in the art will understand, machine controller 30 uses these variances to make decisions regarding changes in operation of machine 10. The changes are designed to maintain the quality parameters within specified tolerances of the target values using techniques that are well known in the art. For example, variances in basis weight may be used to determine whether a valve (not shown) which controls the flow of thick matter supply into a material suspension supply should be opened or closed. In this manner, the concentration of the material suspension being supplied to the headbox may be controlled or adjusted as desired to increase or decrease the basis weight of web 12.

According to a preferred embodiment, controller 30 transmits each basis weight measurement it receives (or generates) to a database server 34 so that the measurement can be promptly logged to a primary data historian 38. Alternatively, the measurements received by controller 30 may be logged to a database stored directly on controller 30, in which case data server 34 would not be necessary. According to a preferred embodiment, each scan across web 12 results in a large plurality of basis weight measurements (e.g., 256 or 512). For convenience, the unique basis weight measurements taken during each scan may be identified and stored in data historian 38 using a format such as BW1, BW2, BW3, . . . , BW256, which are sometimes referred to as unique "tags" or "data streams". Thus, in the foregoing example, the data historian 38 would record 256 tags or data streams for basis weight on a real time basis, with each tag or data stream being updated every 20 or 30 seconds (depending on the scan speed).

Figure 3:
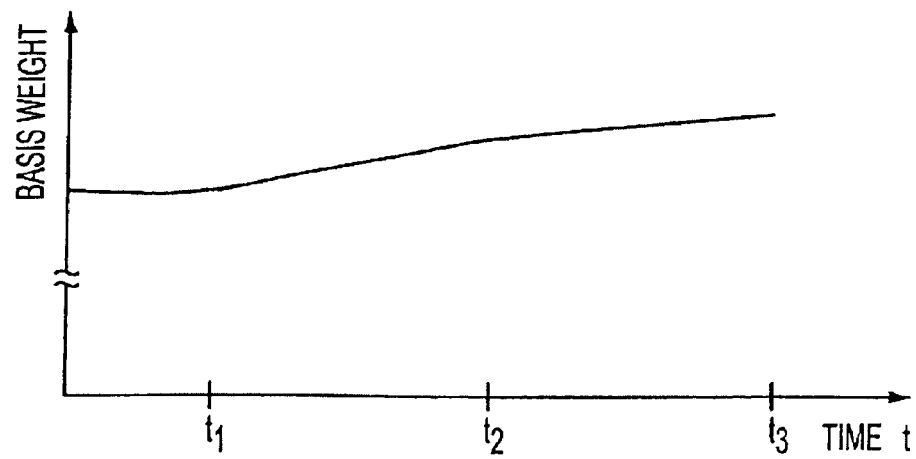
FIG. 3 is a graphic representation of the chronological course of the basis weight of the web in the paper machine as shown in FIGS. 2A–2C.
Figure 4A:
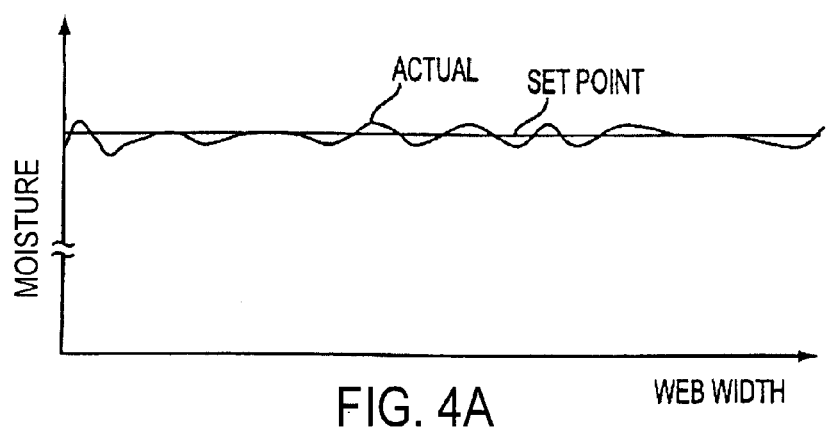
FIGS. 4A–4C are moisture content cross-direction profiles of a web in the paper machine of FIG. 1 at times $t_1$, $t_2$ and $t_3$, respectively.
Figure 4B:
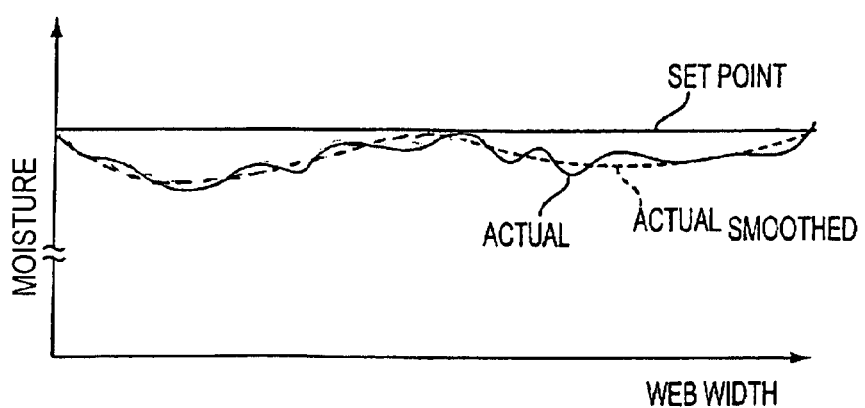
Figure 4C:
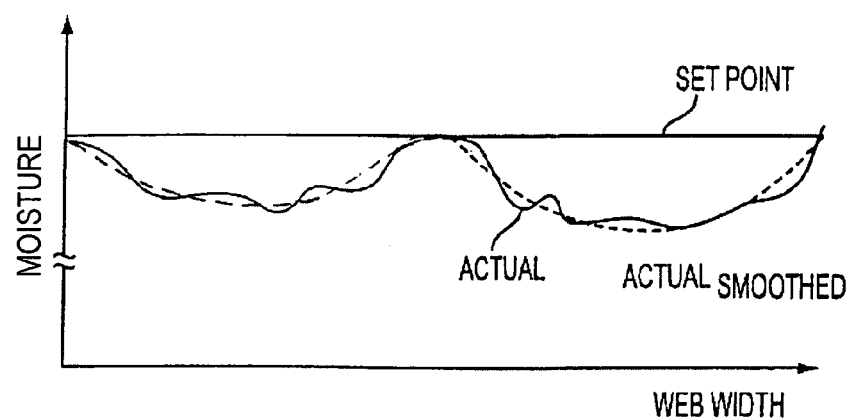

As persons skilled in the art will understand, the above-described control loop is used to regulate long-wave (i.e., low-frequency) variations of the basis weight of web 12 in the machine direction. In order to regulate a cross-direction basis weight profile, the measurements obtained from sensing device 28 can be utilized in a second control loop that regulates sectioned partial streams to headbox 14. This can be accomplished, for example, with the aid of actuators 40 and/or valves 42 in a manner that is well known in the art. FIGS. 2A–2D show basis weight cross-direction profiles of web 12 taken at times $t_1$, $t_2$ and $t_3$, respectively. FIG. 3 shows the machine direction (i.e., chronological) basis weight profile for web 12 obtained during the same time period.

In addition to the two above-described control loops, machine 10 may include a third control loop that is used to regulate moisture content of web 12. Machine controller 30 performs this regulation by comparing moisture content cross-direction measurements obtained from sensing device 28 during each scan to target values to obtain variances. As persons skilled in the art will appreciate, these variances can be used to adjust the moisture content of web 12 in a number of different ways. For example, controller 30 can use the variances to make decisions regarding adjusting the speed of web 12 through machine 10 to increase or decrease the drying time. Alternatively, or in addition, controller 30 can use the variances to make decisions regarding adjusting the amount of heat energy (e.g., steam) supplied to dryer section 20 to increase or decrease the evaporation rate. As yet another example, controller 30 can use the variances to make decisions regarding opening or closing valves 42 to increase or decrease the amount of water supplied to different sections of headbox 14. Other techniques for altering the moisture content or other quality parameters of web 12 are also known to persons skilled in the art and could be used.

Figure 5:
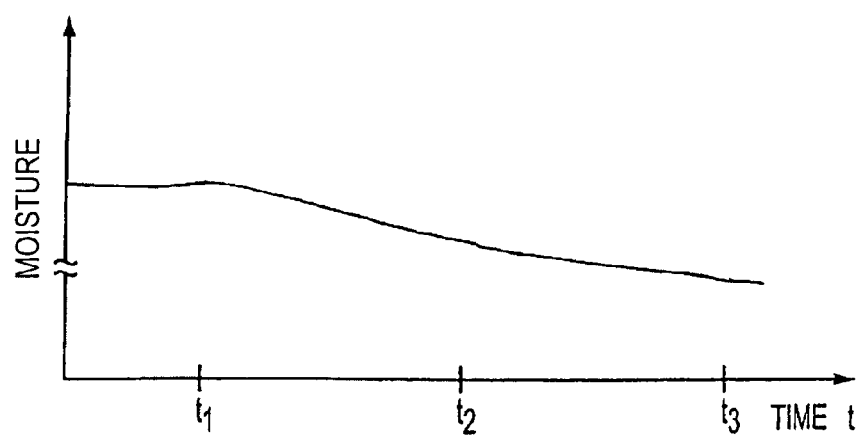
FIG. 5 is a graphic representation of the chronological course of the moisture content of the web in the paper machine as shown in FIGS. 4A–4C.

According to a preferred embodiment, controller 30 forwards the moisture content measurements it receives from sensing device 28 to data server 34 for logging into data historian 38. Preferably, each scan across web 12 results in a large number of moisture content measurements (e.g., 256 or 512). These moisture content measurements can be identified and stored in data historian 38 as MC1, MC2, MC3, . . . , MC256, which is said to contain 256 unique tags or data streams for moisture. FIGS. 4A–4D show moisture content cross-direction profiles of web 12 taken at times $t_1$, $t_2$ and $t_3$, respectively. FIG. 5 shows the machine direction (i.e., chronological) moisture content profile for web 12 obtained during the same time period.

As mentioned above, the measurements of basis weight and moisture from scanning device 28 are logged to data historian 38 along with any other quality parameters of interest (e.g., caliper and opacity). To distinguish the quality control measurements obtained from one scan from similar measurements obtained during other scans, data historian 38 typically appends unique identifying data to each measurement at the time it is logged. For example, information such as the date and time of the beginning of the scan, the machine number (e.g., PM1), the mill name, and the like, can be associated and stored with each measurement.

In addition to quality measurements, data historian 38 may also record measurements of certain parameters associated with machine operation. For example, data historian 38 may record pressures, temperatures, vibrations and other machine obtained from sensors (e.g., transducers) that are permanently (or temporarily) mounted on machine 10. As persons skilled in the art will appreciate, this sensor data can be utilized during subsequent analysis to diagnose the state of the machine and possibly identify a problem that has developed or, in some instances, is about to develop.

In addition to recording data on the quality of web 12 and machine operation, data historian 38 may record other information of interest to the mill. For example, data historian 38 may record production information for the current reel, such as the number of seconds since the last scan, the average machine speed at the end of the scan, the current value of trim at the end of the scan, the cumulative production on the current reel up to the current scan, and the cumulative length of the reel up to the current scan. Persons skilled in the art will recognize numerous other production statistics that could be determined and recorded in data historian 38.

A number of commercially available database products are known in the art that are capable of reliably recording all of the above-described types of data. One commercially available product that is widely utilized in the paper processing industry is known as the PI System®, which is sold by OSIsoft located in San Leandro, Calif.

Now that the structure and operation of machine 10 and the associated data measuring and logging equipment have been adequately described, an apparatus and method for mining this data to assist the mill operator with making well informed, economic based decisions will be provided. According to one embodiment, the measurement data logged to data historian 38 is analyzed to determine the economic impact (e.g., missed or lost profit opportunity) resulting from manufacturing the product outside of the desired quality specifications set by the customer (e.g., a higher basis weight and/or lower moisture content than required by the customer).

Figure 6:
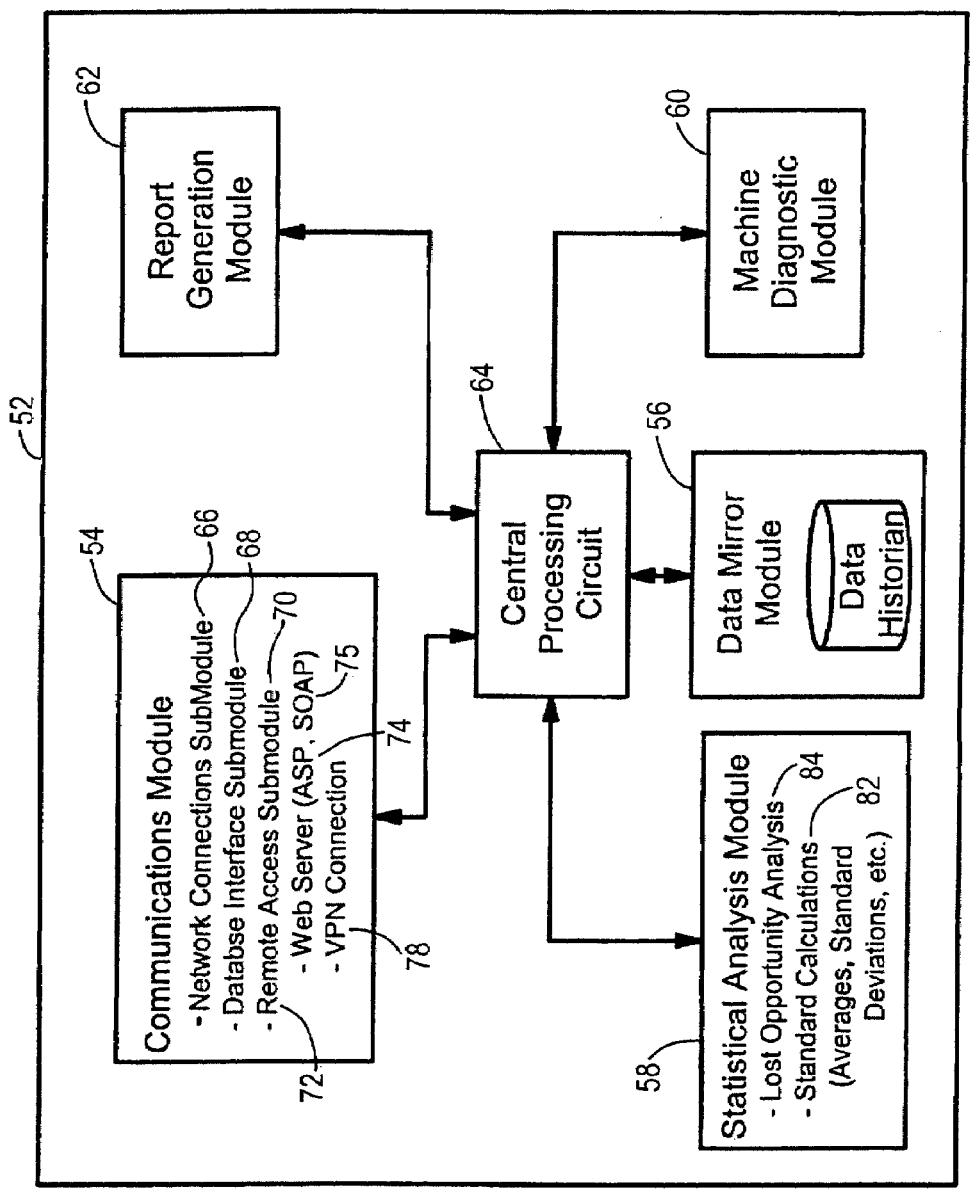
FIG. 6 is a block diagram of software which may be loaded on and executed by any of the severs as shown in FIG. 1 for practicing the present invention.

According to a preferred embodiment of the present invention, a duplicate server 52 is loaded with software such as the components shown in FIG. 6. In the illustrated embodiment, duplicate server 52 includes a communications software module 54, a data mirror software module 56, a statistical analysis software module 58, a machine diagnostic software module 60, and a report generation software module 62. Server 52 also includes a central processing circuit 64 (e.g., a microprocessor and associated circuitry) that is capable of storing and executing the above-referenced software modules. Duplicate server 52 may be a laptop computer which can be easily transported to the mill and connected to the mill's existing network. By way of example and not limitation, duplicate sever 52 may be a Windows® based laptop including a Pentium® processor running Windows 2000® or XP®, and loaded with PI System® software, sold by OSIsoft located in San Leandro, Calif.

Preferably, communications software module 54 includes at least two components: a network software module 66 for connecting to the mill's existing network and a database interface software module 68 for connecting with data historian 38 on data server 34. Network software 66 can be any type of communications software that is known in the art for connecting to networks, with the sole requirement being compatibility with the mill's existing network. For example, network software 66 could be TCP/IP over Fast Ethernet or, alternatively, a wireless network protocol such as Bluetooth® or IEEE 802.11b. If security is a concern (such as if duplicate server 52 is owned by an outside service vendor rather than the mill), the mill's network administrator can issue a user name and password to the user/owner of server 52 to limit access. If desired, the mill network administrator can further improve network security by defining a new group with read only access to the approved data streams in historian 38 and assign the laptop to the new group. Although not presently preferred due to security reasons and other constraints, it may be possible to eliminate the network software on server 52 by providing a direct connection between the primary and duplicate data servers 34 and 52, such as by using a serial or parallel cable connected through the ports on the backs of most computers. USB, FireWire and similar computer-to-computer connections are also possible.

In addition to network software 66, communications module 54 preferably includes interface software 68 that allows high-speed transfer of uncompressed data from historian 38 on primary server 34 to data mirror 56 on duplicate server 52. Preferably, interface software 68 is capable of automatically mirroring all data on historian 38 to mirror 56 without requiring any human interaction once the database-to-database interface is established. Hence, an exact copy of all data received by historian 38 from machine controller 30 (or other data source) can be promptly mirrored to data mirror 56 on duplicate server 52 substantially in real-time, i.e., while a reel is being processed. In addition to the real-time data access, interface software 68 preferably allows historical data on historian database 38 to be copied to data mirror 56 at the same resolution that the data is stored on primary server 34. Thus, several year's worth of data can be conveniently mirrored to duplicate server 52 for analysis and remote access (as explained more fully below) with little or no risk of disruption or a security breach to the mill's primary data server. Moreover, the owner of duplicate server 52 is not constrained by any policies of the mill regarding software installation and maintenance or licensing issues. As persons skilled in the art will appreciate, the data copied from historian 38 on server 34 to mirror 56 on server 52 may comprise data obtained from a single machine or, alternatively, from all machines in the mill.

In addition to network software 66 and interface software 68, communications software 54 may also include a remote access software module 70. In the illustrated embodiment, remote access software 70 includes a conventional web server program 72 that handles the exchange of information over the Internet (e.g., via a standard TCP/IP connection) to a remote user computer 76 (see FIG. 1) including a standard web browser 77 (or similar viewing software). If desired, web server 72 may implement an Active Server Pages (ASP) application 74, which is available from Microsoft Corporation of Redmond, Wash. As persons skilled in the art will appreciate, ASP application 74 allows web server 72 to obtain machine specific and process specific information from data mirror 56 and to display that information as a web page without utilizing web pages that have been specifically designed for the particular machine and process. Website 72 may store a plurality of files such as HTML and ASP files, image files, and web site configuration data.

In addition to ASP application 74, communication software 54 may also include a Simple Object Access Protocol (SOAP) element 75 to circumvent any interoperability issues and allow remote procedure invocations to pass through firewalls. As is well known in the IT industry, SOAP defines a standard syntax for expressing information required to make remote service invocations, including the location of the service provider, service or method to be invoked, parameters to be passed in, and return parameter information. SOAP is based on Extensible Markup Language (XML), which is a text-based language.

According to a preferred embodiment, remote access software 70 also includes a Virtual Private Network (VPN) connection 78 for connecting to a central hosting server 80. As is well known in the IT industry, a VPN connection provides encrypted (i.e., secure) communication between two or more geographically separated sites over a public network (e.g., the Internet), typically at speeds as fast as an Internet connection. This arrangement provides several advantages over relying solely on duplicate server 52 to handle all the data storage and processing. For example, this approach provides improved scalability for multiple customers and offers a simplified maintenance strategy. Using this arrangement, the data storage and analysis that would otherwise need to be handled entirely by duplicate server 52 can be "off-loaded" to central hosting server 80, which can write the results (and any intermediate calculations) back to duplicate server 52. If this is done, the results of the statistical analysis performed by hosting server 80 are readily available to remote user 76 and anyone else having Internet access and authority for remotely accessing duplicate server 52 with little or no delay.

As mentioned above, duplicate server 52 and/or central hosting server 80 includes statistical analysis software 58 for analyzing the data in data mirror 56. Because the statistical analysis is performed on duplicate server 52 and/or hosting server 80 (rather than on machine controller 30 or primary data server 34), there is a lower risk of interruption to the mill's operations and less security risks than would otherwise be the case.

The statistical analysis performed by module 58 may include a wide variety of calculations 82 which have become standardized in the industry. By way of example and not limitation, calculations 82 may include the reel average for basis weight and moisture, as well as for any other quality parameters of interest such as caliper and opacity. As another example, calculations 82 may include the "percent on"

machine direction and cross-direction control for one or more quality parameters of interest. Additional examples of standard calculations 82 include the machine direction and cross-direction standard deviation for each reel, total standard deviation for each reel, residual standard deviation for each reel, and cost of production normalized to one dry ton basis (or some other unit of measure).

According to a preferred embodiment, statistical analysis module 58 also performs certain calculations that are not standard in the industry and have not previously been provided in an automated manner, particularly not substantially in real time (i.e., during manufacture of the web product). Specifically, analysis module 58 includes logic for performing missed opportunity (i.e., lost profit) calculations 84. According to a preferred embodiment, lost profit calculations 84 are accomplished by performing a spectral analysis of the machine and cross-direction quality measurements to identify long wavelength (i.e., low frequency) variations in which the associated peaks fall outside the desired quality specifications. The spectrum analysis is also performed to determine what percentage of the variations are within a controllable range of frequencies, and hence are potentially removable. Based on this information, module 58 is able to determine how much the target specification for the quality parameter could be shifted if the controllable variations in the parameter were not present. In this manner, analysis module 58 can determine a target shift in a quality parameter of interest (e.g., basis weight, conditioned weight, moisture, opacity, caliper) that could be made if the machine were properly controlled. In addition, analysis module 58 includes logic for transforming the estimated target shift amount into an economic cost (i.e., dollar value) value by applying appropriate cost factors.

As persons skilled in the art will appreciate, one way to perform lost opportunity analysis 84 is to perform a Fourier analysis on the machine and cross-direction quality measurements. Alternatively, a pattern recognition process or similar, known process of applied mathematics could be used. According to a preferred embodiment, lost opportunity analysis 84 involves performing a Fast Fourier Transform (FFT) calculation each time new data arrives at mirror 56. Thus, an FFT is preferably performed on the most recent set of data points (e.g., 256 or 512 measurements) which are available at the end of each scan across the web or at reel turn-up (e.g., about every 20 or 30 seconds, depending on the scan speed). Preferably, the results of the FFT calculations are copied back to mirror 56 so that subsequent requests for access to the analysis are sped up.

As mentioned above, lost opportunity analysis 84 is preferably executed by duplicate server 52 and/or hosting server 80 to quantify the lost profit opportunities that are resulting from the long wavelength (i.e., low-frequency) variations in quality parameters (e.g., basis weight and moisture) that are within the controllable range of a properly working machine having a well-tuned control strategy. As persons skilled in the art will understand, FFTs can be used to determine the fraction of variances in the parameters being controlled that are within in the controllable frequencies. Typically, the controllable frequencies for parameters such as basis weight and moisture include wavelengths that are longer than 2 to 3 times the sum of the time constant for the process plus the dead time of the machine (i.e., the time delay between when changes are made in machine operation at the wet end and when changes are first detected in the measured web parameters at the dry end). Using values for gain and dead time that are typical of paper machines, it can be determined that variations in basis weight or moisture content which are longer than about 5 minutes can be removed.

As mentioned above, statistical analysis module 58 preferably performs lost opportunity calculations 84 by computing an FFT for the most recent set of data in mirror 56, which typically is available shortly after the end of each scan and at real turn-up. According to a preferred embodiment, module 58 computes a graph of the FFT using either 256 or 512 data points. For each graph, the location, height and width of each peak is computed, along with the area under each peak. According to a preferred embodiment, if the height of a peak exceeds a certain value, an alarm condition may be triggered and a notification sent to appropriate personnel, such as by email or pager. In addition, module 58 computes a threshold value based on the time delay between the headbox and sensing device 28 in loading gauge 22. As persons skilled in the art will understand, this threshold value represents the cut-off frequency of a well-tuned 2×2 machine direction controller. Thus, the area under each peak to the left of the threshold value represents the amount of variation that can be removed (e.g., by shifting the basis weight target down or the moisture content target up) while still meeting the customer's specifications.

Based on the forgoing information, data analysis module 58 is able to calculate a specific quantity or percentage of each quality parameter being controlled that could have been saved if the machine controller had been properly controlling the process. For example, module 58 may determine that if the controllable (long wavelength) variations in basis weight were eliminated, the mill could shift the target specification for basis weight from 44 lbs per thousand square feet to 42 lbs per thousand square feet, and still meet the customer's specifications. This would result in a savings of 2 lbs of fiber for every thousand square feet of production, which can be calculated from the speed and width of the web.

Figure 7:
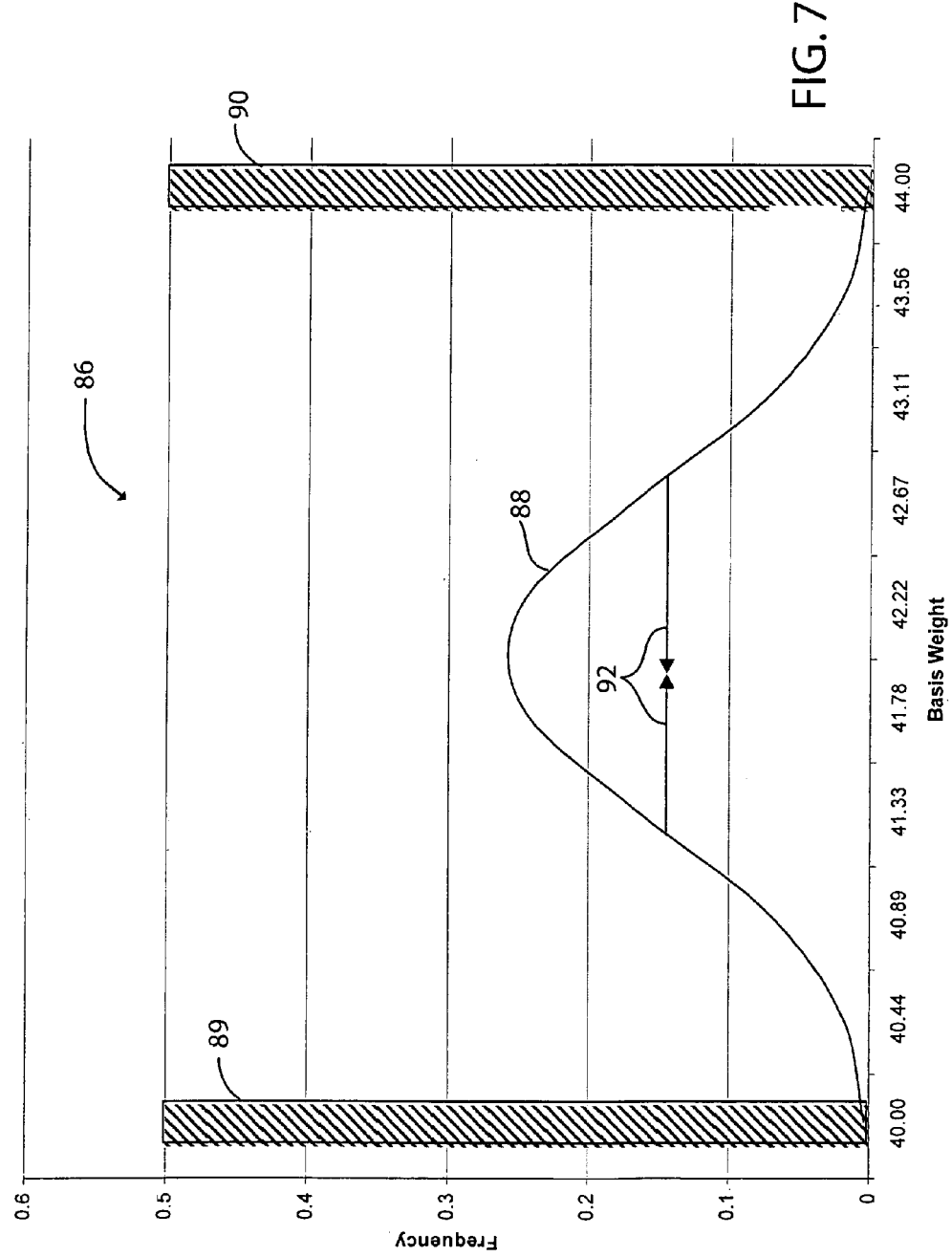
FIGS. 7–10 are graphs showing data plots of basis weight measurements according to various examples.

Turning now to FIGS. 7–10, examples of data plots of basis weight measurements are shown to further illustrate the invention. In FIG. 7, a graph 86 illustrates an exemplary distribution of basis weight measurements (indicated by a line 88) that just fits within the specified lower and higher quality limits (indicated by bars 89 and 90, respectively). Thus, the target for basis weight average (i.e., the nominal value) cannot be changed in this example without increasing the percentage of production rejected. If analysis module 85 were run on the basis weight measurements for this example, the report would indicate a value of zero for the lost opportunity analysis. Thus, a shift in basis weight is only possible in this example if the process variation is reduced somehow (as indicated by arrows 92). For example, it may be possible to eliminate a portion of the low frequency variation by tuning the appropriate control loops. In addition, high frequency variation can possibly be removed by redesign, rebuilding, etc. If either of these is done in this case, then module 85 could be re-executed to determine a shift in basis weight target that would then be possible. An example of this type of shift is discussed in the next example with reference to FIG. 8.

Figure 8:
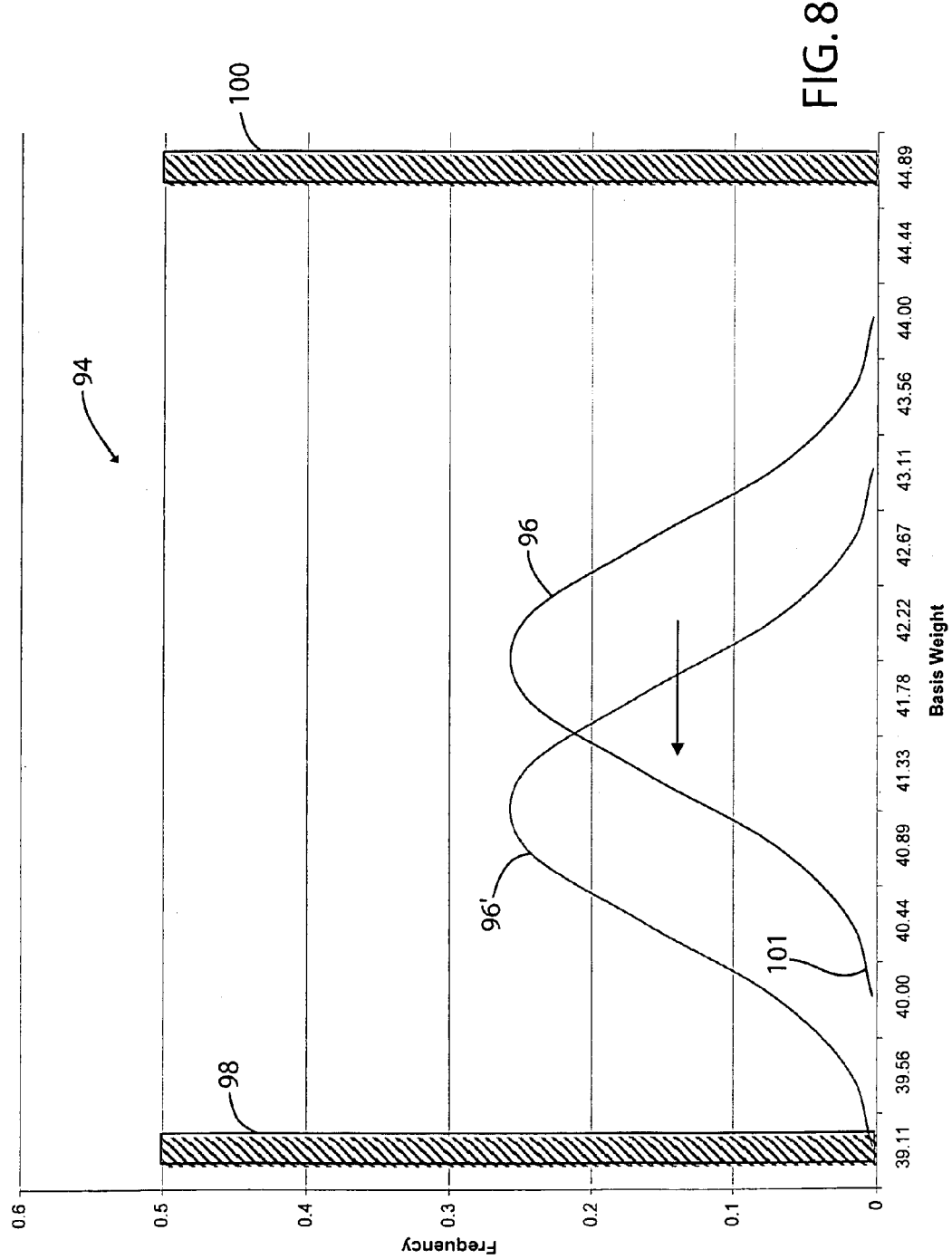

In FIG. 8, a graph 94 illustrates an exemplary distribution of basis weight measurements (indicated by a line 96) that fits well within the specified lower and higher quality limits (indicated by bars 98 and 100, respectively). Thus, the average target for basis weight can be shifted down without increasing the percentage of production rejected. In particular, the basis weight target can be shifted left until a tail 101 of the basis weight distribution 96 just hits lower quality limit 98, thus producing a new basis weight distribution (indicated by a line 96'). If module 85 were run on this set of measurement data, it would be capable of determining the percentage of target downshift in basis weight that is possible, as well as computing the corresponding economic savings of the shift (as discussed more fully below). In a preferred embodiment, the upper and lower basis weight tails are calculated by finding the third standard deviation (i.e., 3 sigma) of the basis weight measurements, which captures approximately 99.87% of the data points (assuming the distribution is normal). The tails used for determining target shifts in moisture content can be computed in the same or different way.

Figure 9:
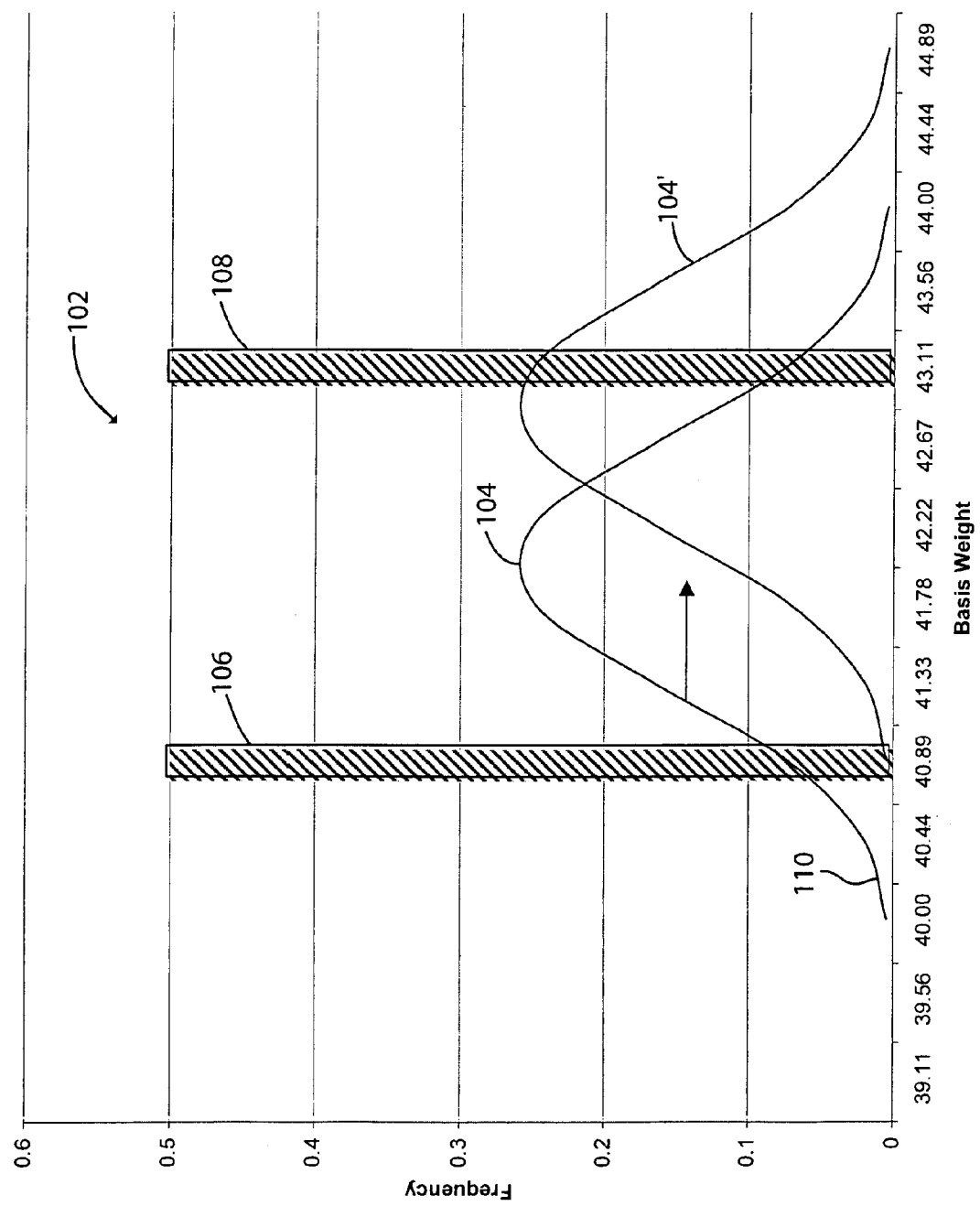
Figure 10:
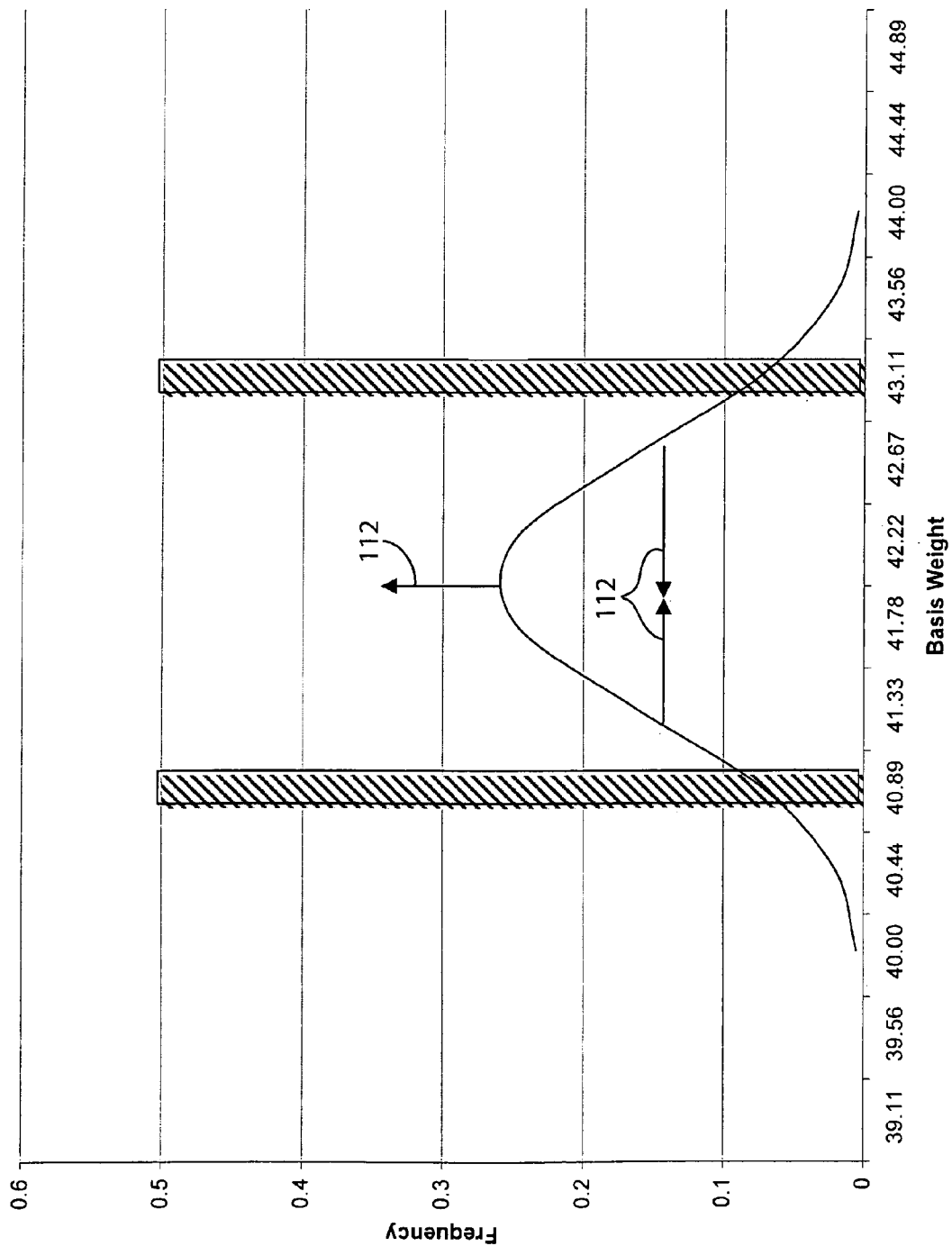

In FIG. 9, a graph 102 illustrates an exemplary distribution of basis weight measurements (indicated by a line 104) that does not fit within the lower or higher quality specification limits (indicated by bars 106 and 108, respectively). Thus, a certain portion of the production will be rejected even with the target average located midway between quality limits 106 and 108. If excess basis weight is acceptable to the customer (i.e., saleable), however, the target average for basis weight can be shifted up until a lower tail 110 of distribution 104 just touches lower quality limit 106 (as indicated by shifted distribution line 104'). As discussed above, excess basis weight increases manufacturing costs. Module 85 can be run on this measurement data to provide the mill operator with the specific dollar cost of shifting the target amount as indicated (i.e., the economic cost of operating at the higher basis weight target indicated by line 104' rather than the original lower basis weight target indicated by line 104). As persons skilled in the art will appreciate, it may be possible to eliminate this economic penalty by reducing the process variation so that basis weight is less widely distributed (see arrows 112 in FIG. 10). Several exemplary techniques for reducing the long term variations in a process parameter are provided above. Additional techniques for reducing process variations are well known to persons skilled in the art and could be utilized.

Once the target shifts have been estimated, module 58 can apply cost factors to the shifts to convert the quantity or percentage information into a dollar amount that may be more meaningful to the mill operator. For example, module 58 can convert a target shift in basis weight into an associated lost profit cost expressed in dollars per ton of fiber. This dollar amount an also be expressed as the amount of profit the mill is incurring (or has incurred) for a given amount of production (e.g., per reel or number of reels) or for a given time period (e.g., per day, week, month), or in any other form that is meaningful to the operator. Similar calculations can also be performed for target shifts in moisture content or other quality parameters of interest (e.g., caliper, opacity, conditioned weight).

As persons skilled in the art will appreciate, the data analyzed in lost opportunity calculations 84 may be obtained from a single machine in a mill, from a number of machines in a mill, or from multiple machines located at a group of mills. Moreover, the data may be analyzed by module 58 at the same time as (or shortly after) the data is logged to the data historians (i.e., substantially in real time). Alternatively, the data may be analyzed long after production has finished and be conducted over a large period of time (e.g., for a one or six month period).

As persons skilled in the art will understand, cost information such as described above would be of substantial benefit to a mill, particularly if provided in a timely manner. For example, because upgrading or replacing a machine or control system tends to be quite costly, the decision to go forward must typically be justified from a return on equity standpoint. Hence, cost information such as provided by lost opportunity calculations 84 as described above is helpful to the mill operator because it assigns a dollar value to the decision of not going forward with a process improvement. If the profit lost from not making a process improvement exceeds the costs of implementing the improvement, the decision is likely an easy one.

In addition to the lost profit analysis, duplicate server 52 preferably includes machine diagnostic software module 60 that can be used to look for the possible root cause of the controllable variations in quality measurements that are outside the desired specification range, and thus resulting in the lost profit. Module 60 can accomplish this task by performing a frequency analysis for the measured machine operation data that is similar to the frequency analysis described above for the quality parameter data. That is, a pattern recognition or spectrum (e.g., FFT) analysis can be performed on the machine data to look for machine parameters from the wet end (e.g., vibrations from a pump or screen) having substantially the same frequency spectrum as oscillations in a quality measurement that is exceeding the target specification. Thus, if the spectrum analysis shows that the basis weight profile has periodic oscillations that exceed the target specification at a certain frequency (e.g., 5.5. Hz), module 60 will look for measured machine performance parameters that include significant periodic disturbances at the same frequency.

After a suspected problem has been identified by module 60 and a proposed solution implemented, statistical analysis module 58 can be re-executed during subsequent processing of a paperboard or paper web to verify that the solution was in fact successful. Moreover, statistical analysis module 58 can be executed on historical data to determine when the problem first arose, as well as how much the problem has cost the mill since inception in terms of money or lost production.

Finally, report generation module 62 on duplicate server 52 (or on central hosting computer 80) can be used to run a wide variety of search queries on the data stored in data mirror 56 and to provide a set of corresponding reports. For example, an operator can access duplicate server 52 (either locally at the mill or from a remote location over the Internet or other communications medium) and request any number of pre-configured production and quality reports, as well as lost opportunity reports and diagnostic reports. Moreover, the reports can be run based on data as it is acquired substantially in real time, or, alternatively, based on historical data. In addition, the reports can be run over data obtained from a single machine at a mill, all the machines at a mill, or all the machines located at one or several mills that meet certain requirements (i.e., search criteria). This latter capability is particularly important because a single paper MACHINE may be utilized to make many different grades of paper (e.g., 12 to 15) randomly throughout the year. As persons skilled in the art will appreciate, each time the grade is changed the machine can behave differently. This represents a data handling problem that is best handled by providing the mill operator with the capability to slice and dice the data in a wide variety of ways. Thus, the present invention preferably permits the operator to instruct report generation module 62 to perform a lost opportunity analysis for paper on a single machine or a set of machines, and to further restrict the results to specific productions that match user-specified search criteria such as grade, basis weight, color, caliper, veracity, and the like.

As persons skilled in the art will appreciate, the present invention provides a substantial improvement in the art for performing what previously had been manually intensive tasks, such as calculating the economic cost of manufacturing a web product that falls outside the customer's specifications, establishing base lines for a machine or group of machines, or diagnosing suspected problems in machine operation that are causing the specifications to be exceeded (either high or low). In the past, service technicians hired to perform any of these tasks typically had to manually install individual transducers on the machines and measure the parameters of interest. For some devices in the machines, it was extremely difficult or impossible to install transducers to obtain the signals. Moreover, technicians using their own measuring equipment typically only looked at the measurements for a limited period of time (e.g., two minutes) at one sample location before moving to the next location. By using the data from a primary data historian database, these tasks can be performed by an automated system that provides a substantial improvement over the manual techniques. For example, the technician is able to give more competent recommendations to the mill for machine or process improvements because the recommendations are based on larger (e.g., retroactively for a year or more) and more timely sets of data (e.g., in real time). Also, this allows the technicians to detect intermittent problems that could easily be missed by monitoring equipment that is only installed on an as needed basis.

It is important to note that the above-described preferred and alternative embodiments of the present invention are illustrative only. Although the invention has been described in conjunction with specific embodiments thereof, those skilled in the art will appreciate that numerous modifications are possible without materially departing from the novel teachings and advantages of the subject matter described herein. For example, although the above-described embodiments show the use of a duplicate server for storing the mill data and performing the statistical analysis, the mill's primary server could be utilized to perform the requisite statistical analysis assuming that sufficient storage and processing capacity is available and security is not a concern if remote access is provided. As another example, although the central hosting computer is illustrated as connected to the duplicate server, the central hosting computer could instead be directly connected to the mill's primary server, in which case the duplicate server could be eliminated. As yet a further example, although the lost opportunity analysis described above utilizes basis weight, conditioned weight could be used instead. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. An automated system for analyzing data obtained during manufacture of a web of paper or paperboard on a machine, comprising:
  a computer including a database module, a statistical analysis module, and a processor for executing the modules;
  wherein the database module contains measurements of quality parameters obtained from the web during manufacture, at least some of the measurements exhibiting periodic variations within a controllable frequency of the machine; and
  wherein the statistical analysis module is capable of being executed by the processor to analyze the measurement data and estimate a target shift in at least one quality parameter that could be made if the controllable variations were removed.

2. The system of claim 1, wherein the target shift is estimated by performing Fourier analysis of the measurement data.

3. The system of claim 2, wherein the Fourier analysis involves performing Fast Fourier Transformations (FFTs).

4. The system of claim 1, wherein the statistical analysis is performed on sets of measurement data obtained during a plurality of scans of the web.

5. The system of claim 4, wherein the statistical analysis includes performing a spectral analysis on each set of data to identify long wavelength oscillations in the at least one quality parameter that exceed a desired quality specification for the parameter and are within a controllable range, and aggregating areas that are outside the desired quality specification.

6. The system of claim 4, wherein the statistical analysis is performed on at least one set of measurement data concurrently with manufacture of the web.

7. The system of claim 6, wherein the statistical analysis is performed on each set of measurement data shortly after an end of a scan across a width of the web or at reel turn-up.

8. The system of claim 4, wherein the statistical analysis is performed on at least one set of measurement data subsequent to manufacture of the web.

9. The system of claim 4, wherein each set of measurement data includes at least one of cross-direction measurements and machine direction measurements.

10. The system of claim 9, wherein each set of measurement data includes both cross-direction measurements and machine direction measurements.

11. The system of claim 1, wherein the statistical analysis module is executed by the microprocessor to transform the target shift an economic value.

12. The system of claim 1, further including a report module, wherein the report module is capable of being executed by the processor to display the target shift.

13. The system of claim 12, wherein the target shift is expressed as at least one of a percentage and a quantity.

14. The system of claim 1, wherein the quality parameters include at least one of basis weight, conditioned weight, moisture, caliper and opacity.

15. The system of claim 1, wherein the quality parameters include basis weight and moisture, and wherein the statistical analysis module is executed by the processor to determine a first target shift based on an amount that a basis weight distribution tail is above a desired basis weight specification lower limit and a second target shift based on an amount that a moisture distribution tail is below a desired moisture specification upper limit.

16. The system of claim 1, further including a diagnostic module.

17. The system of claim 16, wherein the database module contains measurements of machine parameters obtained during manufacture of the web, and wherein the diagnostic module is executed by the processor to identify at least one of the machine parameters having periodic variations that correspond to the periodic variations in the quality measurements that are within the controllable range.

18. The system of claim 17, wherein the diagnostic module identifies the at least one machine parameter by performing a Fourier analysis on the machine parameters.

19. The system of claim 1, wherein the computer is a laptop sever connected to a primary server by a network connection.

20. The system of claim 1, wherein the computer is a central hosting server connected to a primary server by a remote connection.

21. The system of claim 1, wherein the computer includes a communications module which can be executed by the processor to enable at least one of remote access and central hosting access.

22. The system of claim 1, wherein the computer includes a report generating module which can be executed by the processor to provide reports.

23. The system of claim 22, wherein the reports can be performed on subsets of measurement data that match user-defined search criteria.

24. The system of claim 23, wherein the user-defined search criteria includes at least one of a machine identification, a mill site identification, a grade of quality, and a time of manufacture.

25. The system of claim 1, wherein the target shift corresponds to a percentage or amount that the at least one quality parameter is outside a customer specified quality limit.

26. A method for analyzing data obtained during manufacture of a web of paper or paperboard on a machine using an automated system, the system including a computer containing a database module, a statistical analysis module, and a processor for executing the modules, the database module containing measurements of quality parameters obtained from the web during manufacture, the method comprising:
    executing the statistical analysis module on the processor to perform a statistical analysis of the measurement data in the database module to estimate a target shift in at least one quality parameter that could be made if the controllable variations were removed.

27. The method of claim 26, wherein the target shift is estimated by performing Fourier analysis of the measurement data.

28. The method of claim 27, wherein the Fourier analysis includes performing Fast Fourier Transformations (FFT).

29. The method of claim 26, wherein the statistical analysis is performed on sets of measurement data obtained during a plurality of scans of the web.

30. The method of claim 29, wherein the executing step includes performing a spectral analysis on each set of data to identify long wavelength oscillations in the at least one quality parameter that are outside a desired quality specification for the parameter and are within a controllable range, and aggregating areas that are outside the desired quality specification.

31. The method of claim 29, wherein the statistical analysis is performed on at least one set of measurement data concurrently with manufacture of the web.

32. The method of claim 29, wherein the statistical analysis is performed on at least one set of measurement data subsequent to manufacture of the web.

33. The method of claim 29, wherein each set of measurement data includes at least one of cross-direction measurements and machine-direction measurements.

34. The method of claim 26, wherein the executing step includes transforming the target shift into an economic value, and the method further comprises displaying the economic value on a display.

35. The method of claim 26, further including display the target shift, wherein the target shift is expressed as at least one of a percentage or a quantity.

36. The method of claim 26, wherein the quality parameters include at least one of basis weight, conditioned weight, moisture, caliper and opacity.

37. The method of claim 26, wherein the quality parameters include basis weight and moisture, and wherein the executing step includes determining a first target shift based on an amount that a basis weight distribution tail is above a desired basis weight specification lower limit and a second target shift based on an amount that a moisture distribution tail is below a desired moisture specification upper limit.

38. The method of claim 26, wherein the database module contains measurements of machine parameters obtained during manufacture of the web, and the system includes a diagnostic module, the method further including executing the diagnostic module on the processor to identify at least one of the machine parameters having periodic variations that correspond to the periodic variations in the quality measurements that are within the controllable range.

39. The method of claim 38, wherein the diagnostic module identifies the at least one machine parameter by performing a Fourier analysis on the machine parameters.

40. The method of claim 26, wherein the computer is a laptop sever connected to a primary server by a network connection.

41. The method of claim 26, wherein the computer is a central hosting server connected to a primary server by a remote connection.

42. The method of claim 26, wherein the system includes a communication module, and the method further includes executing the communications module on the processor to mirror data from a data historian on a primary server to the database module.

43. The method of claim 25, wherein the target shift corresponds to a percentage or amount that the at least one quality parameter is outside a customer specified quality limit.

* * * * *